(12) United States Patent
Rasanen et al.

(10) Patent No.: US 7,324,459 B2
(45) Date of Patent: Jan. 29, 2008

(54) NEGOTIATION OF TRANSMISSION PARAMETER

(75) Inventors: Juha Rasanen, Espoo (FI); Jani Ekman, Kangasala (FI); Janne Haikonen, Tampere (FI); Antti Vahatalo, Tampere (FI)

(73) Assignee: Nokia Corporation, Espoo (FR)

( * ) Notice: Subject to any disclaimer, the term of this patent is extended or adjusted under 35 U.S.C. 154(b) by 715 days.

(21) Appl. No.: 10/381,260

(22) PCT Filed: Sep. 20, 2001

(86) PCT No.: PCT/IB01/01954

§ 371 (c)(1),
(2), (4) Date: Aug. 13, 2002

(87) PCT Pub. No.: WO02/25888

PCT Pub. Date: Mar. 28, 2002

(65) Prior Publication Data

US 2004/0032846 A1    Feb. 19, 2004

(30) Foreign Application Priority Data

Sep. 22, 2000 (GB) .................................. 0023338.7

(51) Int. Cl.
*H04L 1/00* (2006.01)
(52) U.S. Cl. ................................................... 370/252
(58) Field of Classification Search ............. 370/236.1, 370/252, 338, 395.32, 254, 465, 253
See application file for complete search history.

(56) References Cited

U.S. PATENT DOCUMENTS

| | | | |
|---|---|---|---|
| 5,029,164 A * | 7/1991 | Goldstein et al. ........... 370/235 |
| 5,745,480 A | 4/1998 | Behtash et al. |
| 5,787,483 A * | 7/1998 | Jam et al. .................... 711/158 |
| 6,377,799 B1 * | 4/2002 | Hameleers et al. ...... 455/422.1 |
| 6,850,778 B1 * | 2/2005 | Honkala et al. ............ 455/560 |

FOREIGN PATENT DOCUMENTS

WO    WO 00/18081    3/2000

* cited by examiner

*Primary Examiner*—Ricky Q. Ngo
*Assistant Examiner*—Pao Sinkantarakorn
(74) *Attorney, Agent, or Firm*—Squire, Sanders & Dempsey L.L.P.

(57) ABSTRACT

A negotiation unit for operation in a communication system whereby a first communication unit may transmit data to a second communication unit by means of a protocol including the step of negotiating a parameter for use in the operation of the protocol by the transmission of a first negotiation message to the second communication unit and in response thereto the transmission of a second negotiation message from the second communication unit to the first communication unit, the negotiation messages being configured to be capable of including data defining a value for the parameter, the negotiation unit comprising: storage means for storing information on a criterion on the parameter, interception means for intercepting at least one of the negotiation messages directed towards one of the first and second communication units; and message analysis means for analysing the intercepted negotiation message and if the message includes a value for the parameter f) checking whether the stored criterion on the value is met, g) if the criterion is not met, modifying the message to include a value for the parameter that meets the criterion, and sending the modified message towards the said one recipient.

28 Claims, 6 Drawing Sheets

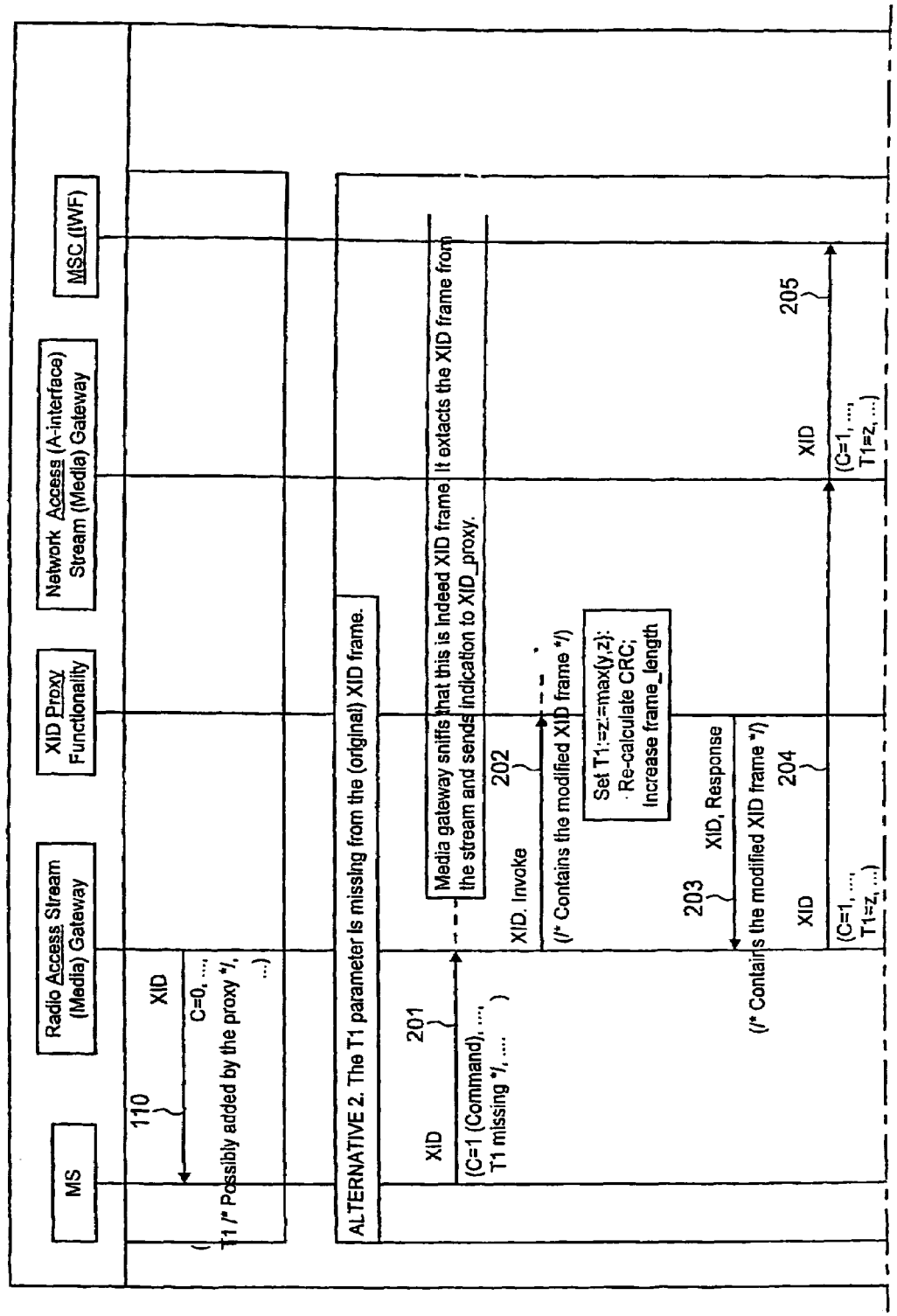

NEGOTIATION OF TRANSMISSION PARAMETER

Figure 1:
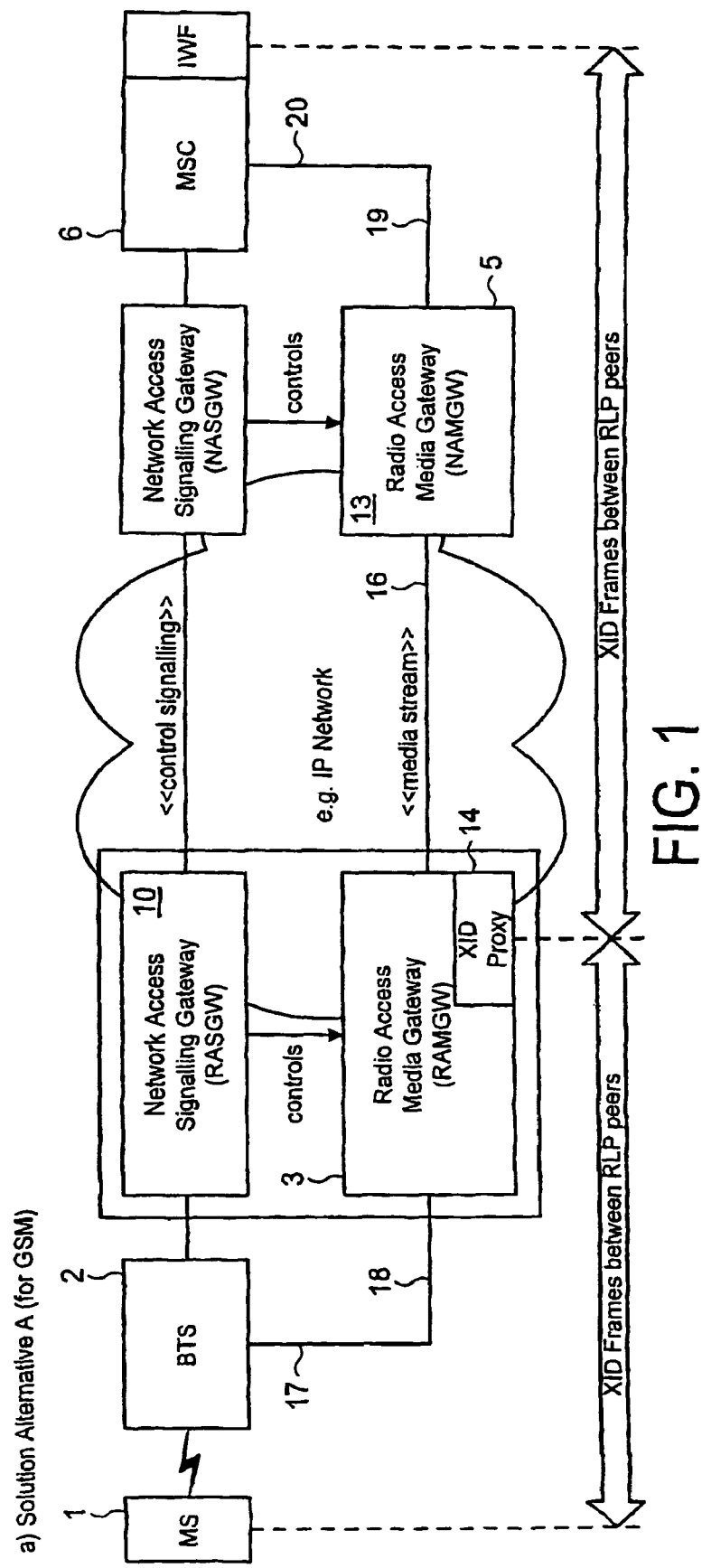

This invention relates to negotiation of a transmission parameter such as a parameters relating to accepted transmission delays, especially between data transmission and reception units.

In the GSM (Global System for Mobile Communications) telecommunication system a method for handling non-transparent data calls is defined by GSM recommendation 04.22. The method makes use of the radio link protocol (RLP). The RLP is aimed at providing error-free data transmission. Data can be sent by means of the RLP from a data transmission unit to a data reception unit. When the data reception unit determines that it has correctly received a block (frame) of data it transmits to the data transmission unit an acknowledgement for that block. If no acknowledgement is received within a set time then the block is retransmitted.

Between them the units maintain two timers. The T1 timer is associated with the data transmission unit and measures the period after transmission of a block of data. The T2 timer is associated with the receiver and measures the period after the receipt of a block of data. Maximum values for the T1 and T2 timers ($T1_{max}$ and $T2_{max}$) are defined by default settings and/or by negotiation between the units.

The maximum value of the T2 timer indicates the maximum permissible period the data reception unit is permitted between receiving of a block of data and transmitting an acknowledgement message for that block of data. Thus if a block of data is received correctly the data reception unit must transmit an acknowledgement for that data before the T2 timer reaches the T2 maximum value. The T2 timer allows the data reception unit some limited flexibility in the timing of its transmission of the acknowledgement message to allow the transmission to be slotted between the other functions that the reception unit must perform.

The maximum value of the T1 timer indicates the period after the transmission of a block of data at which the data transmission unit should assume that no acknowledgement from the data reception unit is forthcoming. If the T1 timer reaches the T1 maximum value after transmission of a block of data without an acknowledgement for that block having been received then the data transmission unit must retransmit the block. GSM 04.22 specifies that for correct operation:

$$T1_{max} > T2_{max} + 2 \times \text{transmission delay}$$

where transmission delay is the transmission delay for a block of data between the transmission unit and the reception unit.

When the transmission delay is large, and the value of T1 is not correspondingly great according to the above inequality, an acknowledgement message transmitted by the data reception unit may well not arrive at the data transmission unit before the T1 timer has reached $T1_{max}$. In this situation the data transmission unit will retransmit the block of data. This situation will cause failure in the connection, and in the worst case, the call may be disconnected.

To address this problem the units may attempt to measure the delay and negotiate parameters for $T1_{max}$ and $T2_{max}$ inband. To achieve this a protocol entity at one of the units measures the transmission loop delay by sending a test data frame to the other unit and measuring the time taken before an acknowledgement is received. Then the protocol entity uses a standard inband negotiation method (an XID (exchange Information) frame exchange) to agree on new maximum timer values with the other unit. However, in a typical GSM link the transmission delay is within a tightly bounded range so it may be expected that the units will not perform the above procedure and will instead select default values for the maximum timer values based on the expected characteristics of the link. In that case, when unexpected delays arise in the GSM link, as, for example, in an IP (internet protocol) based GSM intranet office (GIO) environment, the RLP data connection may fail due to retransmission overflow.

There is therefore a need for an improved method of handling setting of the values.

According to one aspect of the present invention there is provided 1. A negotiation unit for operation in a communication system whereby a first communication unit may transmit data to a second communication unit by means of a protocol including the step of negotiating a parameter for use in the operation of the protocol by the transmission of a first negotiation message to the second communication unit and in response thereto the transmission of a second negotiation message from the second communication unit to the first communication unit, the negotiation messages being configured to be capable of including data defining a value for the parameter, the negotiation unit comprising: storage means for storing information on a criterion on the parameter, interception means for intercepting at least one of the negotiation messages directed towards one of the first and second communication units; and message analysis means for analysing the Intercepted negotiation message and if the message includes a value for the parameter checking whether the stored criterion on the value is met, if the criterion is not met, modifying the message to include a value for the parameter that meets the criterion, and sending the modified message towards the said one recipient.

According to a second aspect of the present invention there is provided a communication system comprising: a first communication unit and a second communication unit arranged to be operable according to a protocol for transmission of data from the first communication unit to the second communication unit by means of a method including the step of negotiating a parameter for use in the operation of the protocol by the transmission of a first negotiation to the second communication unit and in response thereto the transmission of a second negotiation message from the second communication unit to the first communication unit, the command message and the response message being configured to be capable of including data defining a value for the parameter; and a negotiation unit comprising: storage means for storing information on a criterion on the parameter, interception means for intercepting at least one of the negotiation messages directed towards one of the first and second communication units; and message analysis means for analysing the intercepted negotiation message and if the message includes a value for the parameter checking whether the stored criterion on the value is met, if the criterion is not met, modifying the message to include a value for the parameter that meets the criterion, and sending the modified message towards the said one recipient.

According to a third aspect of the present invention there is provided 15. A method of negotiating a parameter in a communication system wherein a first communication unit may transmit data to a second communication unit by means of a protocol making use of a parameter; the method comprising: storing information on a criterion on the parameter, intercepting a negotiation message for negotiating the parameter passing between the first communication unit and the second communication unit; and analysing the message by the steps of: checking whether the criteria set for the parameter is met, if the criteria is not met, amending the parameter to meet the criteria, and sending the amended parameter forward, suitably to the unit for which it was originally intended.

According to a fourth aspect of the present invention there is provided a message interception unit for operating in a communications system, the interception unit being arranged to store a minimum timer value and operable to: i) intercept a command message from a first communication unit to a second communication unit including a proposed timer value and if that timer value is less than the stored minimum timer value modify the message to include the minimum timer value, send the message after any modification to the second communication unit and store the timer value included in the message as sent to the second communication unit; and ii) intercept a r sponse message from the second communication unit to the first communication unit responsive to the command message and if the response message includes no timer value modify the message to include the stored timer value.

The intercepted negotiation message may be the second negotiation message. In that case, the first negotiation message may be generated by first communication unit or the negotiation unit or another unit.

The intercepted negotiation message may be the first negotiation message. In that case, the first negotiation message is preferably generated by the first communication unit or another unit.

The negotiation unit may be arranged to intercept both the first negotiation message and the second negotiation message in the manner described herein.

The criterion may be a limit value for the parameter and the negotiation unit may be arranged to:
if the intercepted message is the first negotiation message:
  i) determine and store a command parameter value equal to the greater of the limit value and any value for the parameter in the intercepted message;
  ii) if the intercepted message does not include a value for the parameter or if the intercepted message includes a value for the parameter that is smaller than the command parameter value, modify the intercepted message to include a value for the parameter that is equal to the command parameter value; and
  iii) send the intercepted message after any modification to the second communication unit.

The criterion may be a limit value for the parameter and the negotiation unit may be arranged to:
if the intercepted message is the second negotiation message:
  i) If the intercepted message does not include a value for the parameter, modify the intercepted message to include a value for the parameter that is equal to a stored command parameter value; and
  ii) send the intercepted message after any modification to the first communication unit.

The criterion on the parameter may comprise a predetermined limit parameter value and a command parameter value.

The first negotiation message is suitably a command message. The second negotiation message is suitably a response message.

The protocol suitably includes the step of transmitting a unit of data from one of the communication units to the other of the communication units and if the said one of the communication units has not received an acknowledgement for the unit of data within a period indicated by the parameter re-transmitting the unit of data from the said one of the communication units to the other of the communication units. The period is preferably a time period.

The predetermined limit value/minimum timer value is suitably indicative of an expected transmission delay for data from the said one of the communication units to the other of the communication units.

Suitably the first communication unit is arranged to negotiate a timer value by transmitting the first negotiation message including a proposed timer value.

Suitably the second communication unit is arranged to negotiate a timer value by receiving the first negotiation message, determining whether the timer value in the command message is acceptable to it; and if it is, transmitting the second negotiation message to the first communication unit the timer value included in the command message or including no timer value, and If it is not, transmitting a second negotiation message to the first communication unit including alternative timer value.

Suitably the first communication unit is arranged to receive the timer value included in the second negotiation message and operate in accordance with that timer value.

The interception means is suitably arranged to, in modifying a message, modify a check value of the message to be consistent with the content of the message as modified. The interception means is suitably arranged to, in modifying a message, modify a length value of the message to be consistent with the content of the message as modified.

One of the first and second communication units is suitably a mobile station of the telecommunications system, for example an item of user equipment. The mobile station may be mobile or may be fixed in location. Another of the first and second units is suitably an IWF (InterWorking Function) or a mobile switching centre of the telecommunications system. The units are suitably operable according to the GSM system or a derivative thereof.

The protocol is preferably a non-transparent data protocol, for example the GSM radio link protocol (RLP).

The telecommunication system is suitably arranged to carry the command message and the response message by way of an intranet mobile cluster and at least part of the negotiation unit is located in the RAMGW (Radio Access Media GateWay). Alternatively the telecommunication system may suitably be arranged to carry the command message and the response message by way of a NLAMGW (Network Access Media Gateway) and at least part of the negotiation unit may then be located in the NAMGW.

Figure 2:
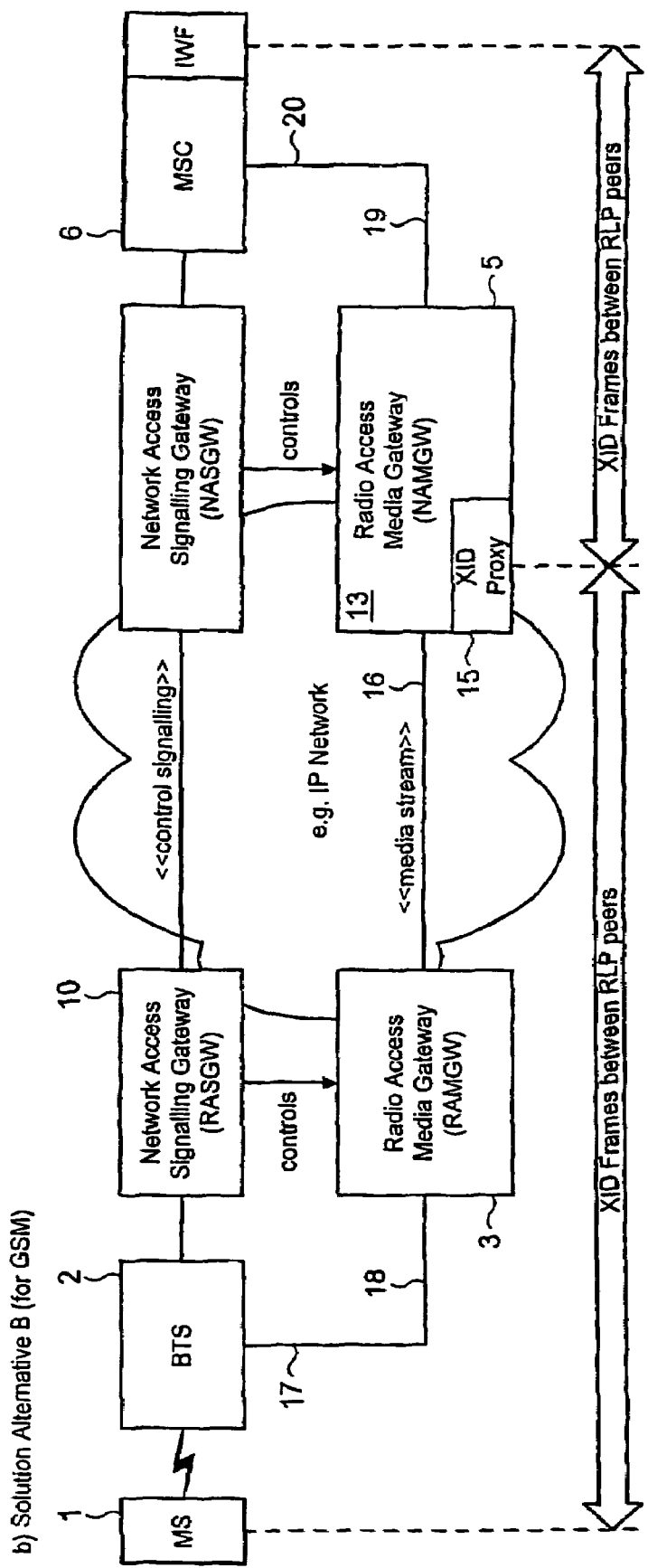
Figure 3A:
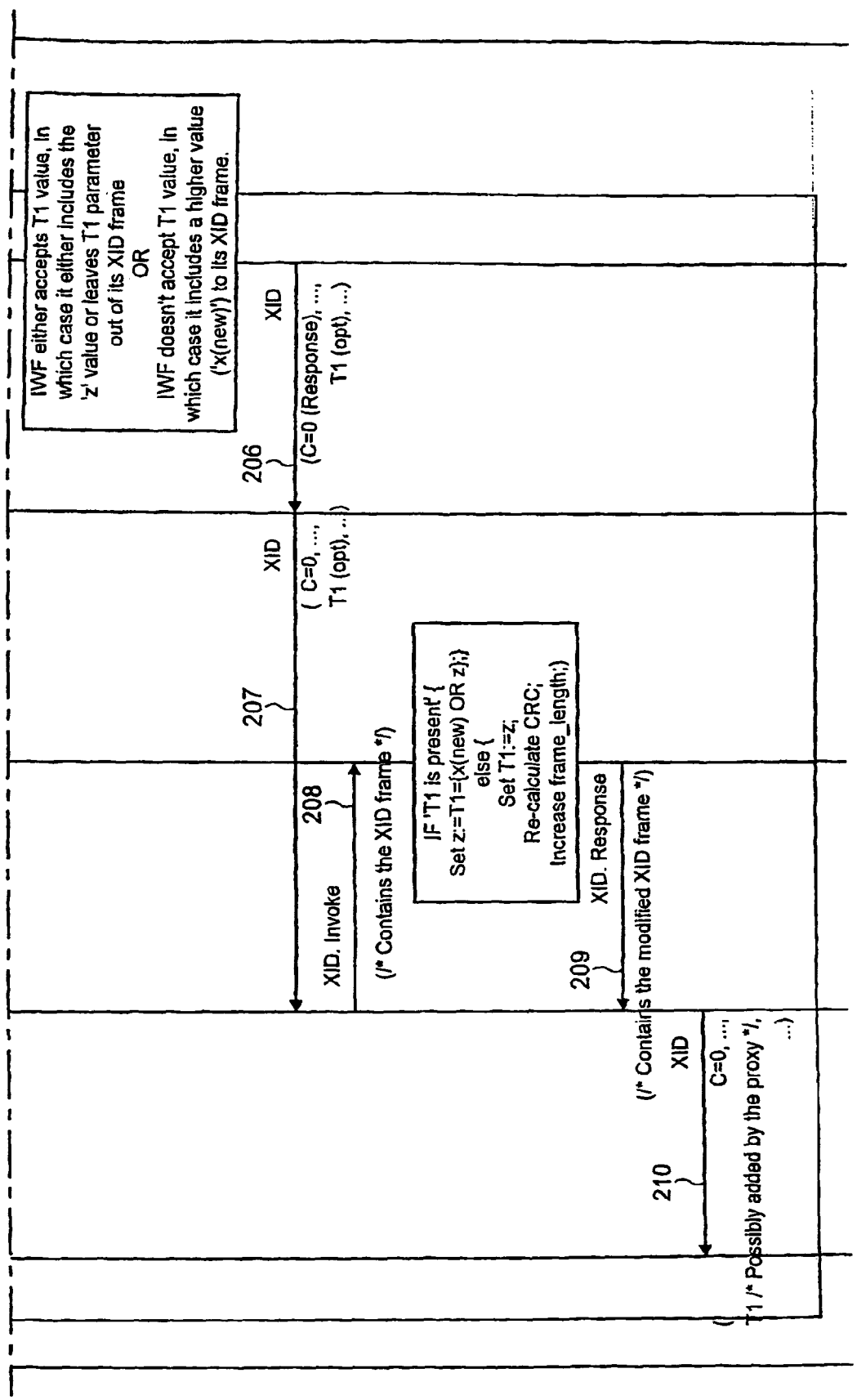
Figure 3B:
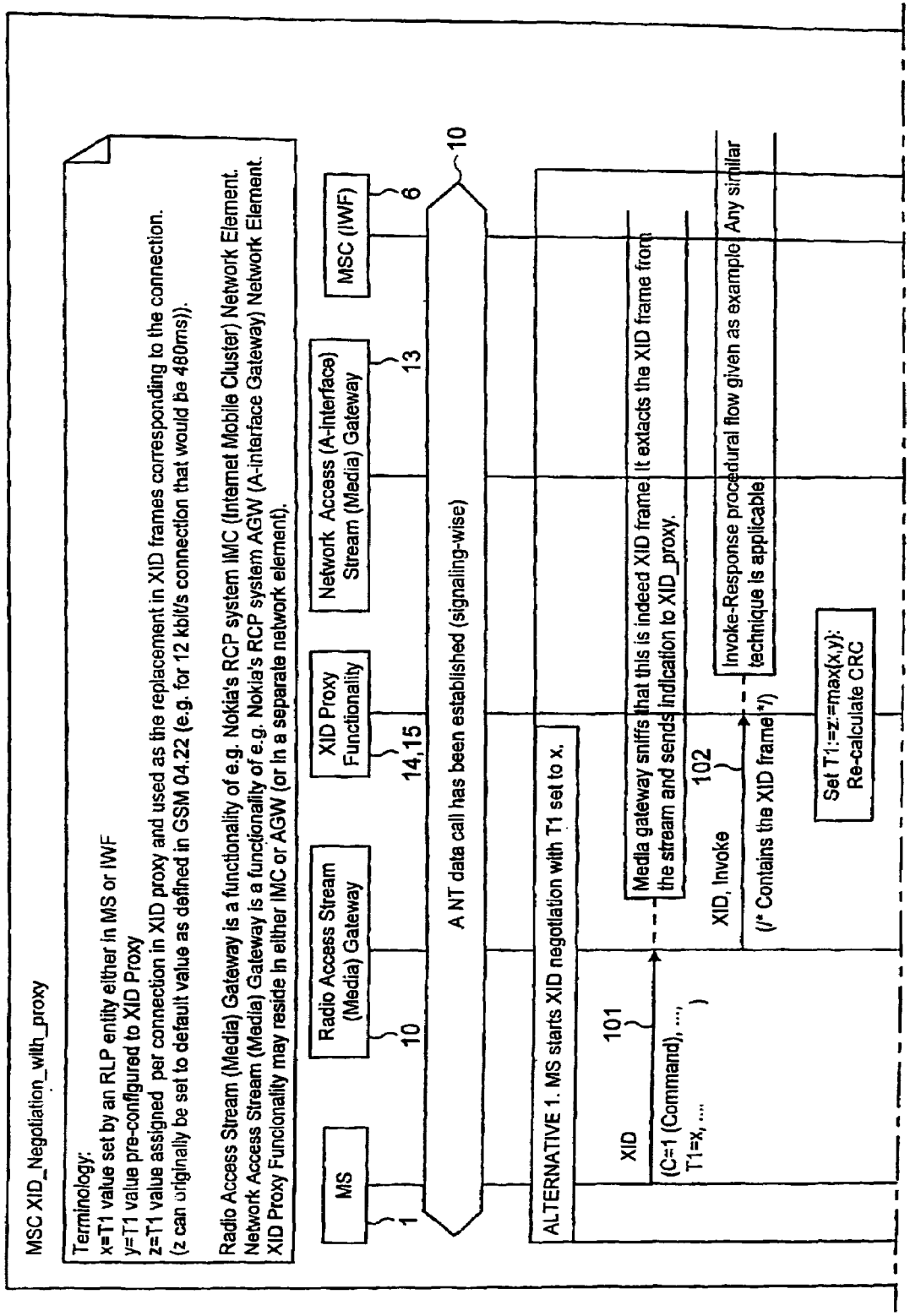
Figure 3B:
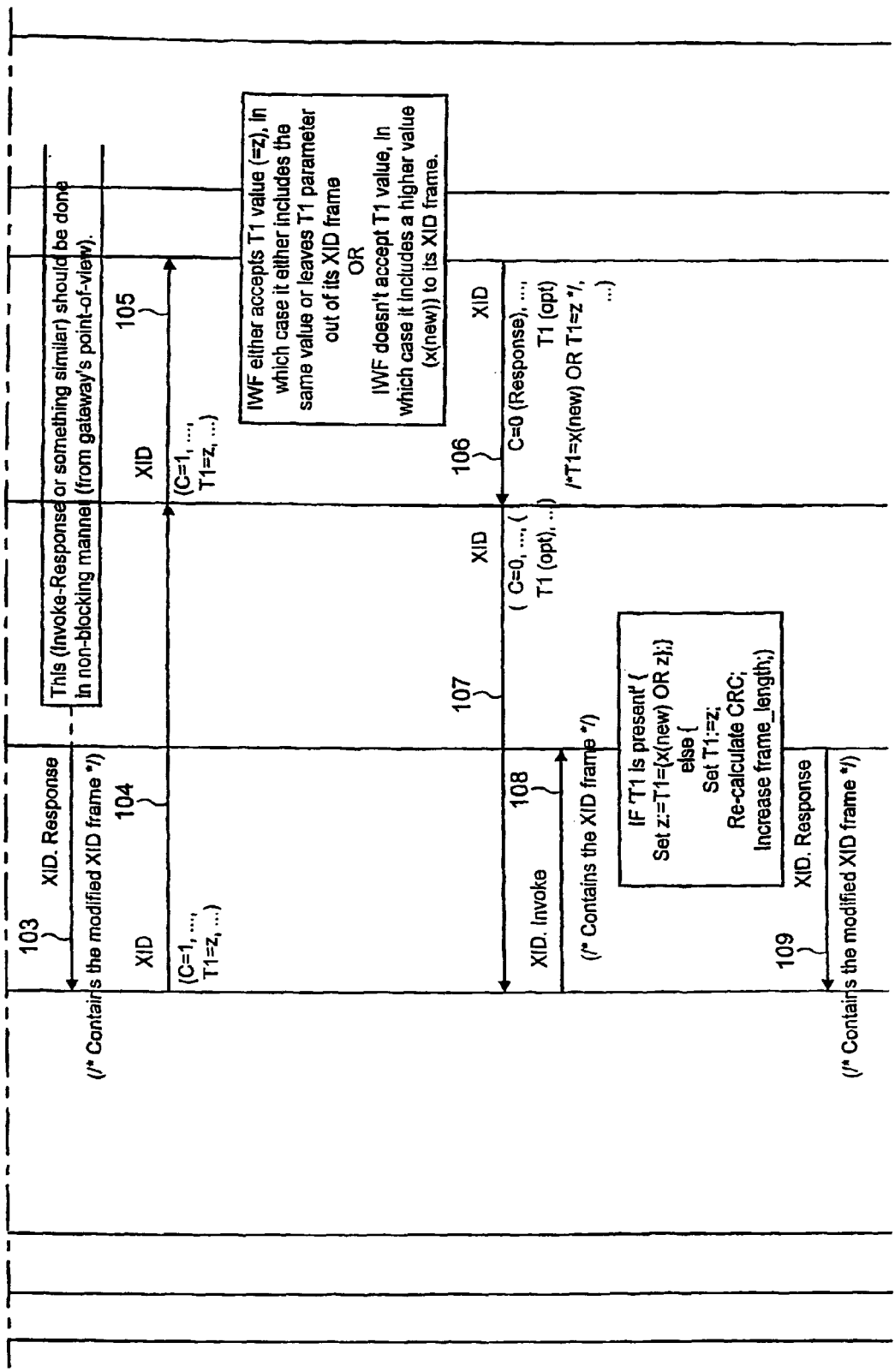

The present invention will now be described by way of example with reference to the accompanying drawings, in which:

FIGS. 1 and 2 are schematic diagrams of a radio telecommunications system; and FIG. 3 illustrates communication paths for negotiation of delay timer values.

In the figures like components are indicated by like reference numerals.

In order to address the issue of inconsistency between the maximum timer values and the transmission delay the system of FIGS. 1 and 2 provides a proxy functionality, located for example in the RAMGW (Radio Access Media GateWay) stream module (see FIG. 1) or the NAMGW (Network Access Media GateWay) (see FIG. 2), that handles negotiation and renegotiation of the maximum timer values between the end units of the RLP link.

For clarity the maximum values of the timers T1 and T2 are referred to herein as $T1_{max}$ and $T2_{max}$, but they are commonly known simply as T1 and T2.

FIG. 1 shows a radio telecommunications system implementing the GSM intranet office approach, and comprising a mobile station (MS) or user equipment (UE) 1 capable of communicating by radio with a base transmission station (BTS) 2. The STS is connected to a RAMGW 3. The RAMGW is connected to a NAMGW 5. The NAMGW is connected to a mobile switching centre (MSC) 6.

Stream data passes directly over link 16 between the RAMGW stream unit 10 of the RAMGW and the NAMGW stream unit 13 of the NAMGW. Corresponding data and stream paths exist between the RAMGW and the BTS (paths 17 and 18 respectively) and the NAMGW and the MSC (paths 19 and 20 respectively).

As will be described in more detail below, the systems of FIGS. 1 and 2 include an XID proxy unit 14, 15, which can be located at the RAMGW stream unit or the NAMGW stream unit or elsewhere. The XID proxy unit monitors and verifies XID commands sent between the MS 1 and the MSC 6 The XID proxy has knowledge of the present timer maximum values for the link between the MS and the MSC. Based on that information it has the capacity to intervene in the process of negotiation of $T1_{max}$ values between the MS and the MSC with the aim of ensuring that the value that is settled upon is large enough to cope with transmission delays that might be outwith the expectations of the MS and the MSC.

The operation of the XID proxy will be described in more detail with reference to FIG. 3. FIG. 3 illustrates two alternative negotiation methods: alternative 1 and alternative 2. FIG. 3 illustrates methods of communication between an MS 1, a radio access stream (media) gateway 10 which is a functionality of the RAMGW network element, the XID proxy functionality 14, 15, a network access (A interface) stream (media) gateway 13 which is a functionality of the NAMGW network element, and the MSC (interworking function) 6. The alternatives will be described in relation to the following terms:

X represents the $T1_{max}$ value indicated in an XID command (C=1) or response (C=0) frame being processed by the XID proxy;

Y represents the preconfigured $T1_{max}$ value for the RCP system, and

Z represents the initial and/or the agreed value for the RLP connection which is initially set to the default value as defined in GSM 04.22.

These parameters in the XID proxy are initialised when a non-transparent connection is created in the NAMGW or RAMGW stream module in which the XID proxy is located. At that time the XID proxy performs the following step:

1. Set Z to the default value of $T1_{max}$ as defined in GSM 04.22

When an XID command frame is passed it is sniffed by th XID proxy, the XID proxy performs the following steps:

1. If the $T1_{max}$ element was included in the frame, set Z to be equal to the maximum of X and Y and modify the frame so that the $T1_{max}$ element is equal to Z.
2. If the $T1_{max}$ element was not included in the frame, set Z to be equal to the maximum of Y and Z and modify the frame to include a $T1_{max}$ element equal to Z.
3. Recalculate the CRC (cyclic redundancy check) value for the frame to account for the modification.
4. Forward the frame to its original destination as indicated in the corresponding invoke message.

When an XID response frame is passed it is sniffed by the XID proxy, the XID proxy performs the following steps:

1. If the $T1_{max}$ element was included in the frame (it being an optional element of an XID response frame), forward the frame unmodified to its original destination.
2. If the $T1_{max}$ element was not included in the frame, modify the frame to include a T1 max element equal to Z.
3. Recalculate the CRC (cyclic redundancy check) value for the frame to account for the modification and if necessary increase the frame length field.
4. Forward the frame to its original destination as indicated in the corresponding invoke message.

By this means, when the XID proxy is initialised it can be fed a value for $T1_{max}$ that is felt by the network or its operator to be sufficiently large to cope with transmission delays arising from the characteristics of the network or otherwise. Then, when an MS and the MSC negotiate a value for $T1_{max}$, by intercepting and if necessary modifying the XID command and response messages exchanged between the MS and the MSC according to th logic indicated above the XID proxy can ensure that the value set in the negotiation process is not smaller than the initially fed value.

Referring to FIG. 3, both alternative methods are preceded by a non-transparent data call having been established by means of signalling (100).

Alternative 1 illustrates the scenario where the negotiation of the $T1_{max}$ value is initiated by the MS. In this scenario, the MS 1 transmits the XID frame to the RAMGW 10 (101). The frame has C=1 indicating that it is a command frame.

The media gateway sniffs the frame and detects that it is indeed an XID frame. It extracts the XID frame from the data stream and sends an invocation signal 108 to the XID proxy. The invocation signal contains the XID frame. Then, the XID proxy sets X to the T1.sub.max value in the frame as received. As indicated above, if the T1 value is present in the frame the XID proxy sets Z=max{X,Z}, where X is the higher T1.sub.max value received in the frame included in the signal 108 and Z is the value derived from processing the preceding command frame; and sets the frame's T1max=Z; if the T1 value is absent the XID proxy sets the frame's T1.sub.max=Z. Then the XID proxy re-calculates the frame's CRC and if necessary increases the frame length field. The modified frame is then returned by the XID proxy to the RAMGW by means of an XID response signal 109 which contains the modified frame. The XID response signal is sent so as to be non-blocking from the point of view of the gateway.

The RAMGW then forwards the modified frame (at 104) as normal to the NAMGW 13, which forwards it (at 105) to the MSC.

If the interworking function (IWF) of the MSC accepts the $T1_{max}$ value in the modified frame it receives, it includes the same value in a response frame towards the MS, or omits the $T1_{max}$ value from the response frame. If the IWF does not accept the $T1_{max}$ value it generates a higher $T1_{max}$ value and includes that in the response frame.

The transmission of the response frame (in which C=0) to the NAMGW is illustrated at 106. The NAMGW then forwards the frame (at 107) to the RAMGW.

The media gateway sniffs the frame and detects that it Is indeed an XID frame. It extracts the XID frame from the data stream and sends an invocation signal 108 to the XID proxy. The invocation signal contains the XID frame. Then, the XID proxy sets X to the $T1_{max}$ value in the frame as received. As indicated above, if the T1 value is present in the frame the XID proxy sets Z=max{X,Z}, where X is the higher $T1_{max}$ value received in the frame included in the signal 108 and Z is the value derived from processing the preceding command frame; and sets the frame's T1max=Z; if the T1 value is absent the XID proxy sets the frame's $T1_{max}$=Z. Then the XID proxy re-calculates the frame's CRC and if necessary increases the frame length field. The modified frame is then returned by the XID proxy to the RAMGW by means of an XID response signal 109 which contains the modified frame. The XID response signal is sent so as to be non-blocking from the point of view of the gateway.

The RAMGW then forwards the modified frame (at 110) as normal to the MS 1.

Alternative 2 illustrates the scenario where the XID negotiation process is initiated by the MS with the $T1_{max}$ value being omitted from the original XID frame. In this scenario, the MS 1 transmits the XID frame to the RAMGW 10 (201). The frame has C=1 indicating that it is a command frame.

The media gateway sniffs the frame and detects that it is indeed an XID frame. It extracts the XID frame from the data stream and sends an invocation signal 203 to the XID proxy. The invocation signal contains the XID frame. As indicated above, the XID proxy sets Z=max{X,Y}=Y (because there is no T1.sub.max value for X in the original XID frame) and sets the frame's Ti.sub.max=Z. Then the XID proxy re-calculates the frame's CRC and if necessary increases the frame length field. The modified frame is then returned by the XID proxy to the RAMGW by means of an XID response signal 203 which contains the modified frame. The XID response signal is sent so as to be non-blocking from the point of view of the gateway.

The RAMGW then forwards the modified frame (at 204) as normal to the NAMGW 13, which forwards it (at 205) to the MSC.

If the interworking function (IWF) of the MSC accepts the $T1_{max}$ value in the modified frame it receives, it includes the same value in a response frame towards the MS, or omits the $T1_{max}$ value from the response frame. If the IWF does not accept the $T1_{max}$ value it generates a higher $T1_{max}$ value and includes that in the response frame.

The transmission of the response frame (in which C=0) to the NAMGW is illustrated at 206. The NAMGW then forwards the frame (at 207) to the RAMGW.

The media gateway sniffs the frame and detects that it is indeed an XID frame. It extracts the XID frame from the data stream and sends an invocation signal 208 to the XID proxy. The invocation signal contains the XID frame. Then, as indicated above, if the T1 value is present in the frame the XID proxy sets Z=max{X,Z}, where X is the higher $T1_{max}$ value received in the frame included in the signal 208, and Z is the value derived from the preceding command frame, and sets the frame's $T1_{max}$=Z; if the T1 value is absent the XID proxy sets the frame's $T1_{max}$=Z. Then the XID proxy recalculates the frame's CRC and if necessary increase the frame length field. The modified frame is then returned by the XID proxy to the RAMGW by means of an XID response signal 209 which contains the modified frame. The XID response signal is sent so as to be non-blocking from the point of view of the gateway.

The RAMGW then forwards the modified frame (at 210) as normal to the MS 1.

By this means the XID proxy can arrange, transparently to the MS and the MSC, that the $T1_{max}$ value agreed as a result of the negotiation process is the greater of the value proposed d by the MS, the value proposed by the MSC and the value with which the XID proxy was initiated.

In the description above, the XID proxy has been described as a distinct unit The XID proxy could be embodied as a distinct unit or as a unit combined with another existing unit, and as hardware or software or both. The XID proxy could be located as described above or in one or more other suitable locations. For example, means could be provided in the locations indicated above for the XID proxy (or elsewhere) to intercept the XID frames, and the intercepted frames could be transmitted to another unit located elsewhere for performing the logic steps described above.

The method described above is applicable to analogous situations where transparent control is to be taken over the negotiation of a value, especially a delay value, in a telecommunication system.

The method described above has been described with specific reference to the GSM system and the RLP protocol. However, the method is not limited to that system. The method could be used in networks operable according to other systems, for example DECT or UMTS, and in relation to other protocols, preferably to non-transparent protocols.

In the method described above the command message is generated by the unit that is to make use of the negotiated parameter. The response message Is generated by the other unit of the link over which the parameter will be employed. In an alternative arrangement the command message may be generated by another unit, for instance a unit in the path between the units at then ends of that link, for example the XID proxy unit. For example, if the intermediate element (e.g. the XID proxy) does not detect a XID frame at the beginning of a transmission between one unit and the other, the intermediate element may send an XID frame with the same new transmission delay timer (equivalent to Acknowledgement Timer T1 in the RLP) value to (e.g.) the MSC. Then when an XID response is received from the MSC, the intermediate element changes the response to a XID command, if Timer T1 value does not exist adds it, and sends the XID command to the MS. When the intermediate element receives the XID response from the MS, it changes the response to a XID-command and sends it to MSC. Finally, when the intermediate element receives the XID response from the MSC, it replaces the response by a NULL frame. This method can similarly be adapted to allow an intermediate unit to initiate negotiation in other like protocols in which initial operation between two endpoints of the link may operate by default according to a parameter that is inappropriate for the conditions.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A negotiation unit for operation in a communication system comprising a first communication unit that can transmit data to a second communication unit by means of a protocol the protocol being configured to negotiate a parameter for use in the operation of the protocol using at least one negotiation message, the negotiation unit being configured to store information on a criterion on the parameter and operable to intercept the at least one negotiation message, analyze the intercepted negotiation message and, if the message includes a value for the parameter a) check whether the stored criterion on the value is met, b) if the criterion is not met, modify the message to include a value for the parameter that meets the criterion and modify a check value of the message to be consistent with the content of the message as modified, and c) send the modified message towards said one recipient.

2. The negotiation unit as claimed in claim 1, wherein the intercepted negotiation message is a second negotiation message.

3. The negotiation unit as claimed in claim 2, wherein a first negotiation message is generated by the negotiation unit.

4. The negotiation unit as claimed in claim 1, wherein the intercepted negotiation message is a first negotiation message.

5. The negotiation unit as claimed in claim 1, wherein a first negotiation message is generated by the first communication unit.

6. The negotiation unit as claimed in claim 1, wherein the negotiation unit is arranged to intercept a first negotiation message and a second negotiation message.

7. The negotiation unit as claimed in claim 4, wherein the criterion is a limit value for the parameter and the negotiation unit is arranged to:

if the intercepted message is the first negotiation message:
i) determine and store a command parameter value equal to the greater of the limit value and any value for the parameter in the intercepted message;
ii) if the intercepted message does not include a value for the parameter or if the intercepted message includes a value for the parameter that is smaller than the command parameter value, modify the intercepted message to include a value for the parameter that is equal to the command parameter value; and
iii) send the intercepted message after any modification to the second communication unit.

8. The negotiation unit as claimed in claim 1, wherein the criterion is a limit value for the parameter and the negotiation unit is arranged to:

if the intercepted message is a second negotiation message:
i) if the intercepted message does not include a value for the parameter, modify the intercepted message to include a value for the parameter that is equal to a stored command parameter value; and
ii) send the intercepted message after any modification to the first communication unit.

9. The negotiation unit according to claim 1, wherein the criterion on the parameter comprises a predetermined limit parameter value and a command parameter value.

10. The negotiation unit according to claim 1, wherein a first negotiation message is a command message.

11. The negotiation unit according to claim 1, wherein a second negotiation message is a response message.

12. The negotiation unit as claimed in claim 1, wherein the protocol is configured to transmit a unit of data from one of the communication units to the other of the communication units and if said one of the communication units has not received an acknowledgement for the unit of data within a period indicated by the parameter re-transmitting the unit of data from said one of the communication units to the other of the communication units.

13. The negotiation unit as claimed in claim 12, wherein the period is a time period.

14. The negotiation unit as claimed in claim 12, wherein a predetermined limit value is indicative of an expected transmission delay for data from said one of the communication units to the other of the communication units.

15. The negotiation unit as claimed in claim 1, wherein the interception unit is arranged to, in modifying a message, modify a length value of the message to be consistent with the content of the message as modified.

16. The negotiation unit as claimed in claim 1, wherein one of the units is a mobile station of the communications system.

17. The negotiation unit as claimed in claim 1, wherein one of the units is a mobile switching center of the communications system.

18. The negotiation unit as claimed in claim 1, wherein the units are operable according to a GSM system or a derivative thereof.

19. The negotiation unit as claimed in claim 1, wherein the protocol is a non-transparent data protocol.

20. The negotiation unit as claimed in claim 19, wherein the protocol is a GSM radio link protocol.

21. The negotiation unit as claimed in claim 1, wherein the communication system is arranged to carry a command message and a response message by way of an intranet mobile cluster and at least part of the negotiation unit is located in the intranet mobile cluster.

22. The negotiation unit as claimed in claim 1, wherein the communication system is arranged to carry a command message and a response message by way of at least one of a radio access media gateway or a network access media gateway and at least part of the negotiation unit is located in at least one of the radio access media gateway or the network access media gateway.

23. A communication system comprising:
a first communication unit and a second communication unit arranged to be operable according to a protocol for transmission of data from the first communication unit to the second communication unit, the protocol for transmission being configured to negotiate timer value for use in an operation of the protocol using at least one negotiation message; and
a negotiation unit being arranged to store information on a criterion on the timer value and operable to intercept the at least one negotiation message, analyze the intercepted negotiation message and if the message includes a value for the timer value
a) check whether the stored criterion on the value is met,
b) if the criterion is not met, modify the message to include a value for the timer value that meets the criterion and modify a check value of the message to be consistent with the content of the message as modified, and
c) sending the modified message towards said one recipient.

24. A method of negotiating a parameter in a communication system comprising a first communication unit configured to transmit data to a second communication unit by means of a protocol making use of a timer value; the method comprising:
storing information on a criterion on the timer value,
intercepting a negotiation message for negotiating the timer value passing between the first communication unit and the second communication unit; and
analysing the message by
a) checking whether the criteria set for the timer value is met,
b) if the criteria is not met, amending the timer value to meet the criteria, and
c) sending the amended timer value forward.

25. A message interception unit for operating in a communications system, the interception unit being arranged to store a minimum timer value and operable to:
  i) intercept a command message from a first communication unit to a second communication unit including a proposed timer value and if that timer value is less than the stored minimum timer value, modify the message to include the minimum timer value, send the message after any modification to the second communication unit and store the timer value included in the message as sent to the second communication unit; and
  ii) intercept a response message from the second communication unit to the first communication unit responsive to the command message and if the response message includes no timer value, modify the message to include the stored timer value.

26. A negotiation unit for operation in a communication system comprising a first communication unit that can transmit data to a second communication unit by means of a protocol, the protocol being configured to negotiate a timer value for use in the operation of the protocol using at least one negotiation message, the negotiation unit comprising:
  storage means for storing information on a criterion on the timer value;
  interception means for intercepting the at least one negotiation message; and
  message analysis means for analyzing the intercepted negotiation message and, if the message includes a value for the timer value
  a) checking whether the stored criterion on the timer value is met,
  b) if the criterion is not met, modifying the message to include a value for the timer value that meets the criterion, and
  c) sending the modified message towards said one recipient.

27. A negotiation unit for operation in a communication system comprising a first communication unit that can transmit data to a second communication unit by means for a protocol, the protocol being configured to negotiate a parameter for use in the operation of the protocol using at least one negotiation message, the negotiation unit being arranged to store information on a criterion on the parameter and operable to intercept the at least one negotiation message, analyze the intercepted negotiation message, and if the message includes a value for the parameter
  check whether the stored criterion on the value is met,
  if the criterion is not met, modify the message to include a value for the timer value that meets the criterion and modify a length value of the message to be consistent with the content of the message as modified, and
  send the modified message towards said one recipient.

28. A negotiation unit for operation in a communication system comprising a first communication unit that can transmit data to a second communication unit by means for a protocol, the protocol being configured to negotiate a parameter for use in the operation of the protocol using at least one negotiation message, the negotiation unit being arranged to store information on a criterion on the parameter, the criterion being a limit value for the parameter, the negotiation unit being operable to intercept the at least one negotiation message, analyze the intercepted negotiation message, and if the message includes a value for the parameter and is a first negotiation message
  determine and store a command parameter value equal to the greater of the limit value and any value for the parameter in the intercepted message;
  if the intercepted message does not include a value for the parameter or if the intercepted message includes a value for the parameter that is smaller than the command parameter value, modify the intercepted message to include a value for the parameter that is equal to the command parameter value; and
  send the intercepted message after any modification to the second communication message.

* * * * *